HUNTING A. F. C. SYSTEM

Filed Oct. 13, 1955

INVENTOR:
WOLF J. GRUEN,
BY Donald N. Timbie
HIS ATTORNEY.

United States Patent Office 2,833,923

Patented May 6, 1958

2,833,923

HUNTING A. F. C. SYSTEM

Wolf J. Gruen, Syracuse, N. Y., assignor to General Electric Company, a corporation of New York Application October 13, 1955, Serial No. 540,301

3 Claims. (Cl. 250—36)

This invention relates to an improved automatic frequency and phase control system for oscillators.

Systems for these purposes are in some instances called upon to synchronize the phase and frequency of a signal developed by a local oscillator with the phase and frequency of a received signal. The system should be able to perform the synchronizing operation with a pass-band which is sufficiently narrow so that the effect of noise voltages are held to a minmum. It should also be able to pull the oscillator into synchronism when the system is first turned on. This latter requirement involves two considerations. The first is that the pull-in range be sufficiently wide and the second is that the pull-in time be short enough. The relationship of these considerations in an automatic frequency control system is such that it is at times found necessary to comprise in a system as both considerations cannot be fully met.

The use of phase detectors in automatic frequency control systems to meet the above requirements is old in the art. In such systems, the phase detector, by comparing the frequency and phase relationships of the local signal and the incoming signal, will cause an error signal to be developed which will pull the oscillator into synchronism. A system depending on this feature alone, if it is to have sufficiently wide pull-in range, is subject to the objection that the noise bandwidth is increased and the dynamic phase error possibilities are correspondingly increased.

Therefore, it is an object of this invention to provide a novel automatic frequency control system which is capable of sweeping an oscillator over a range of frequencies until synchronism with a synchronizing signal is achieved.

It is another object of the invention to provide a novel automatic frequency control system which, by causing an oscillator to sweep over a range of frequencies, increases the pull-in range of the system.

It is still another object of this invention to provide a novel automatic frequency control system which enables an oscillator to have a wider pull-in range while maintaining a narrow noise bandwidth after synchronism has been achieved.

Briefly, the objects of my invention are achieved in one form by the provision of a pair of control components in an automatic frequency control system. The first component may comprise an automatic frequency control loop which includes a means for regulating the phase and frequency of an oscilator; which means is controlled by an error signal developed by a device comparing the oscillator signal with an incoming signal. A second component is provided to cause the oscillator to sweep over a range of frequencies and initiates its action when an error signal is received from a second device comparing the oscillator signal to the incoming signal. The sweep effect of the second component is halted when frequency and phase synchronism with the incoming signal have been achieved by the oscillator.

The novel features which are considered to be characteristic of my invention are set forth with particularity in the appended claims. My invention itself, both as to its organization and method of operation, together with further objects and advantages thereof, may best be understood by reference to the following description taken in connection with the accompanying drawing, wherein:

Figure 1:
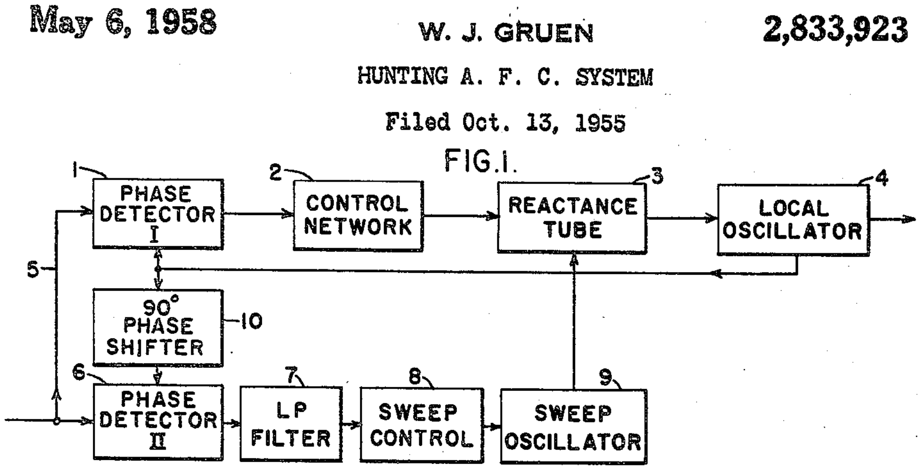
Figure 1 is a block diagram of a circuit embodying my invention.

It may be seen from an inspection of Figure 1, that an automatic frequency control system incorporating my invention includes a standard automatic frequency control loop as a first component. This loop is constituted by a phase detector 1, whose output is coupled to a control network 2. A reactance tube 3, which is effective to vary the phase and frequency of a local oscillator 4, receives the output of the control network 2. It will be apparent to those skilled in the art that a voltage, indicative of the phase and frequency of the oscillator 4, may be derived in several ways and returned to the phase detector 1. Synchronizing signals of any suitable form, such as pulses, continuous waves or bursts, are coupled via the conductor 5 to the input of the phase detector. The output of this phase detector, therefore, includes the beat between the signal indicative of the oscillator output and the synchronizing signal. This output is then coupled to control network 2 and reactance tube 3 to control the phase and frequency of the oscillator 4, in the manner well known in the art.

The second component of my invention comprises a sweep oscillator, the output of which is connected to the devices controlling the frequency of the local oscillator 4 so that it will be swept over a predetermined band of frequencies centered about the frequency of the synchronizing signal. As the local oscillator approaches the frequency of the synchronizing signal, the automatic frequency control loop pulls the system into synchronism and a control signal halts the action of the sweep oscillator. Depending on how the sweep oscillator and its control means are connected to the control signal producing device, a control signal of zero, positive or negative potential may cause it to either start or stop its sweeping oscillations.

In the particular embodiment of my invention, illustrated in Figure 1, the second component of a circuit incorporating my invention comprises a sweep oscillator control means including a second phase detector 6, a filter network 7 receives the output of the phase detector 6 and is coupled to a sweep control device 8 which controls the operation of a relatively low frequency sweep oscillator 9. In this and the other illustrated embodiments of my invention, I have shown the sweep control device 8 as being an element separate from the oscillator 9. However, if desired, a single element, such as a multigrid tube connected as an oscillator and being driven to cut-off upon the application of a suitable voltage to the proper grid, may incorporate both of these functions. A voltage wave indicative of the output of oscillator 4, similar to that described in the preceding paragraph, is fed to the phase detector 6, after being shifted 90° by a phase shifting means 10. The phase detector 6 also receives the synchronizing signal and develops, after filtering, a certain value of a D. C. signal when the local oscillator 4 is not in frequency synchronism with the synchronizing signal. The D. C. signal thus developed, controls the action of the sweep oscillator 9 and its ability to develop low frequency oscillations. These oscillations are then fed to the devices controlling the local oscillator 4, causing it to sweep its frequency at a slow rate over a given range until synchronism is obtained. Upon the achievement of synchronism, a D. C. signal of a different certain value is obtained which halts the action of the sweep oscillator 9. The conventional automatic frequency control loop then maintains the local oscillator in phase and frequency synchronism.

The second or hunting component of the circuit, as pointed out above, receives the synchronizing signal and a signal indicative of the output of the local oscillator 4, after it has been shifted 90° in phase by the network 10.

In the embodiment illustrated, the phase shifting is shown as being carried out in the circuit coupling the local oscillator signal to the phase detector 6. It is obvious, however, that this function may be effected at other points in the system or by a combination of networks shifting the signals less than 90° until the quadrature detecting operation of the phase detectors 1 and 6 is attained. For example, the phase shifting network may be interposed in the conductor 5 before either the phase detectors 1 and 6 or in the circuit coupling the output of the local oscillator 4 to either of these two phase detectors and may comprise a single phase shifting network or a combination of such networks advancing one signal and retarding the other. The networks may advance one signal 45°, retard the other 45°, advance one signal 60°, retard the other 30°, or may be any combination of networks resulting in a 90° phase shift. The resulting relation is that the phase relationship of the signal representative of the output of local oscillator 4 and the synchronizing signal coupled to one phase detector differs by 90° from the phase relationship of the same signals coupled to the other phase detector. When the two signals are in frequency synchronism, the phase detector 6 will have a maximum D. C. voltage output, while the phase detector 1 will have a minimum D. C. control voltage, as is clear from the well known operation of the automatic frequency control loop. The D. C. output from detector 6 is applied through the filter 7 to the sweep control 8 in such a manner as to prevent the sweep oscillator 9 from developing its relatively low frequency signal. When the system is out of synchronism, the second phase detector 6 produces a beat note output, but substantially no D. C. The sweep control 8, in the absence of the D. C. output, then permits the sweep oscillator 9 to initiate its action and to cause the local oscillator 4 to sweep over a band of frequencies, including that of the synchronizing signal. The sweep is halted as synchronism is obtained and the maximum D. C. voltage is produced by the second phase detector 6.

The two components of the system described, cooperate to produce a lock-on type of automatic frequency control system. Thus, when the system is first activated and, if synchronism is not present, the hunting component of the circuit will cause the local oscillator 4, to sweep slowly as described above. As the frequency of the synchronizing signal is reached, the first phase detector 1, which is comparing the local and incoming signals in quadrature relationship as compared to the comparison being made by the second phase detector 6, will produce a control voltage to hold the system in synchronism.

It should be noted that the elements of the sweeping component of the system should be selected with the following considerations in mind. This is that rate and amplitude of the output of the sweep oscillator should not be excessive in relation to the time constant of the automatic frequency control loop so that, as the local oscillator approaches the frequency of the synchronizing signal, the rate of change of frequency of the local oscillator will be such that the control signal of the automatic frequency control loop will be effective to synchronize the local oscillator. Thus, in a system incorporating my invention, the band-pass of the automatic frequency control loop may be kept narrow to reduce the dynamic phase error possibilities of noise voltages but a sufficiently wide pull-in range is provided to ensure synchronism.

A system of this character may have particular application in color television receivers. The present color television standards provide for a burst of reference carrier at the end of each horizontal scanning line. The receiver generates the fundamental color subcarrier frequency which is used to recover the chroma information from the transmitted color signal. It it necessary that subcarriers, generated by circuits in the receiver be synchronized accurately in both, phase and frequency, with the color subcarrier burst. A wide band automatic frequency control system, which permits a wide spectrum of noise voltage to be present in the system, is particularly objectionable in this type of application, as these noise voltages can result in color oscillator phase shifts and objectionable color patterns will appear on the screen of the color picture tube.

In the use of a system incorporating my invention in the situation described immediately above and in other instances, it is obvious to those skilled in the art that the various elements of my invention may take numerous specific forms.

Figure 2:
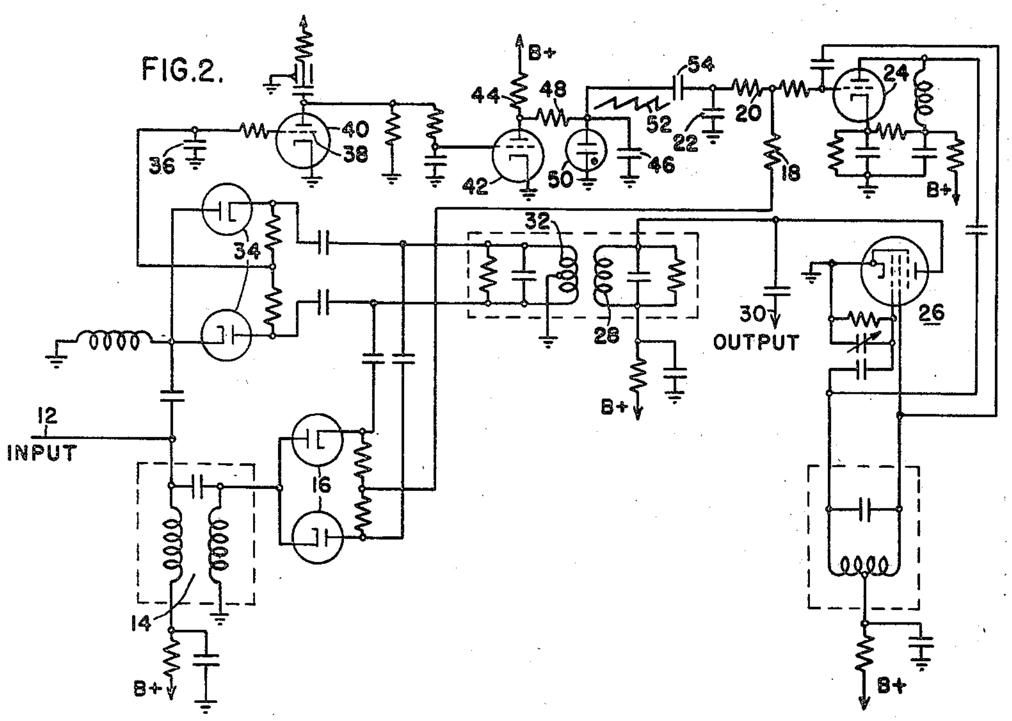
Figure 2 is a schematic diagram of a circuit which may be used to carry out my invention.

In the embodiment shown in Figure 2, the first component of an automatic frequency control system, suitable for use in a color television receiver incorporating my invention, comprises a basic automatic frequency control loop. A synchronising signal, which in this instance is constituted by the transmitted color burst, is supplied over a conductor 12 through a 90° phase shift ing network 14 to a first phase detector 16. The phase detector illustrated is in the form of a pair of diodes and functions in the manner well known in the art. It is obvious, however, that any device capable of comparing two signals and developing an error signal when the frequency or phase do not agree, may be used to produce an error signal in a circuit incorporating my invention. The output of the phase detector 16 is fed to a control network consisting of the resistors 18 and 20 and a grounded capacitor 22 which, in conjunction with a reactance tube 24, control the frequency and phase of local color oscillator 26 in the manner well known in the art. The output of the oscillator 26 is coupled to a primary 28 of a transformer and the color subcarrier wave is taken from an output 30 on the primary. A push-pull signal is developed on the secondary 32 of the oscillator transformer and is applied in one phase to the phase detector 16 to be compared with the phase and frequency of the transmitted color burst.

The second component of a circuit incorporating my invention suitable for use in a color television receiver includes a second phase detector 34 which also receives the synchronizing color burst over the conductor 12. The burst received by this detector is in quadrature with that received by the phase detector 16, as consequence of the action of the phase shifting network 14. A signal from the oscillator-transformer secondary 32 is also fed to the phase detector 34. When the system is in synchronism, the quadrature or second phase detector 34 will produce a maximum amount of negative D. C. output voltage, while the first phase detector 16 produces the D. C. output required to maintain synchronism. On the other hand, when the system is out of synchronism, the second phase detector 34 produces essentially a beat note. If the system is in synchronism, the negative D. C. output of the second phase detector is filtered by the capacitor 36 and applied to a grid 38 of a grid-controlled plate rectifier 40. Positive flyback pulses are taken from the horizontal sweep transformer (not shown) and are capacitively coupled to the plate of the rectifier 40. When the system is out of synchronism and the grid 38 is at zero potential, a large negative D. C. voltage is developed at the plate of the rectifier 40. This negative D. C. is fed to the grid of a sweep control tube 42 and, if sufficiently large, will cut off its plate current. A source of potential is coupled to the plate of the control tube 42 through the resistor 44 and when the plate current of tube 40 is cut off, the plate voltage approaches the value of the source of potential. The capacitor 46 will then charge through the resistors 44 and 48. This charging will continue until the ignition potential of a gas diode 50 is reached, at which point the gas diode fires and discharges capacitor 46 to the gas diode extinction potential. The cycle then repeats, forming the sawtooth wave voltage shown at 52 in the drawing. When the voltage applied to the grid of the sweep control tube 42 goes positive, as it will when the system is in synchronism and a maximum negative D. C. is being applied to the grid 38 of the rectifier 40, the control tube 42 conducts and its plate voltage drops below the ignition potential of the gas diode 50 and the sawtooth oscillations cease.

The repetition rate of the sawtooth oscillator 50 is primarily determined by the time constant of the RC combination 44, 48 and 46 respectively. Its output is applied through a capacitive voltage divider, constituted by the capacitors 22 and 54 which are part of the automatic frequency control network, so that a portion of it is applied to the reactance tube 24 and the color oscillator 26 is swept over a range of frequencies centered around the fundamental of the received color burst.

In the color television application described above, the burst consists of the fundamental frequency component of 3.58 mc. plus sidebands spaced at horizontal scanning intervals of 15.73 kc. Since the duty cycle of the burst is only about 4%, the fundamental frequency and adjacent sidebands are of an equal magnitude. Therefore, to filter out the fundamental frequency arrangement of the burst, the components of the system in this instance should be so chosen to sweep the color oscillator 26 over a range of not more than half the distance between the adjacent burst sidebands.

Figure 3:
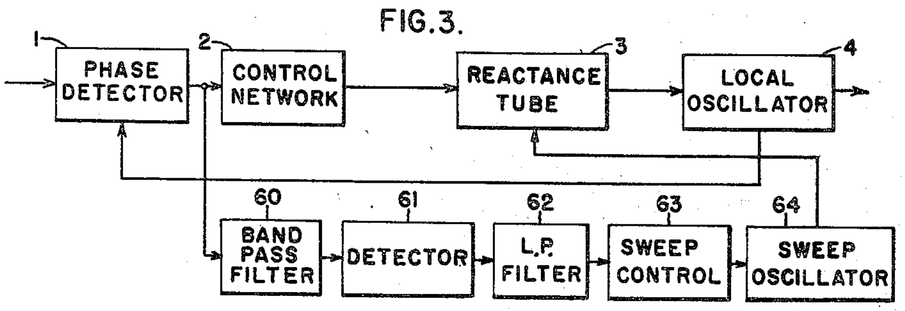
Figure 3 is a block diagram of a second embodiment of my invention.

The system described in the preceding paragraphs, utilizes a second phase detector, detecting in quadrature relation to the automatic frequency loop detector, to develop a D. C. control voltage to determine the action of the sweep oscillator. There are, of course, other ways of obtaining this voltage, as it is merely necessary to develop a control voltage to determine the operation of the sweep oscillator. Another embodiment of my invention, which develops this voltage in a different manner, is illustrated in Figure 3 of the drawing. In this figure, those parts of the system which correspond to parts in the first described embodiment have been given the same reference numerals. Thus, the phase detector 1, control network 2, reactance tube 3 and local oscillator 4 constitute the standard automatic frequency control loop. A portion of the output of the phase detector 1 is coupled to the band-pass filter 60. After filtering, the signal is fed to the detector 61 which is coupled through a low pass filter 62 to a sweep control 63. The sweep control 63 regulates the action of a low frequency sweep oscillator 64, which causes the local oscillator 4 to sweep over the range of frequencies, as described above.

In the operation of this form of my invention, the band-pass filter 60 may have an upper frequency limit equal to the widest frequency divergence between the local oscillator 4 and synchronizing signals for which pull-in is to be effected. When the system is not in synchronism, the phase detector 1 will have an A. C. beat note output, a portion of which will be detected by the detector 61. The polarity of the detector output, when the system is out of synchronism, will, of course, be determined by how it is connected in the circuit. If the output is a negative D. C., it is fed, after filtering by the filter 62 directly to the sweep control 63, which may take the form of the control tube 42, illustrated in Figure 2, and control its conduction and the operation of the sweep oscillator 64, which may also correspond to the sweep oscillator in that figure. On the other hand, if the detector 61 is connected to the filter 60, so as to yield a positive D. C. output, it may be fed after filtering to a grid controlled rectifier, such as shown at 40 in Figure 2, which has been suitably biased to effect rectification when a positive voltage is applied to its grid 38. The output of the rectifier 40 in this latter method of operation is similarly fed to the rest of the sweep control 63, which may take the form of and operate in the same manner as the control tube 42 and its associated circuitry illustrated in Figure 2.

The utility of my system is, of course, not limited to the particular application described above, as it may be used in transmitters and receivers of many types and in devices of a different character.

While I have described a particular embodiment of my invention, other applications and arrangements will readily occur to those skilled in the art. I do not, therefore, desire my invention to be limited to the specific construction illustrated and described and I intend by the accompanying claims to cover all modifications within the spirit and scope of my invention.

What I claim as new and desire to secure by Letters Patent of the United States is:

1. An automatic frequency control system comprising a first phase detector adapted to receive synchronizing signals, an oscillator to be synchronized with said signals, a circuit coupling a signal representative of the output of said oscillator to said first phase detector, oscillator control means coupled to said oscillator to control its phase and frequency in response to an error voltage, a circuit connecting the output of said first phase detector to the input of said oscillator control means so as to couple the error voltage output of said first phase detector to said oscillator control means, a second phase detector adapted to receive said synchronizing signal, a phase shifting circuit coupling the signal representative of said oscillator output to said second phase detector, a control tube having an anode, cathode and control grid with said cathode being connected to ground, means for coupling the output of said second phase detector to the control grid of said control tube, a gaseous discharge device having one electrode connected to ground, a resistor connected between the anode of said control tube and another electrode of said gaseous discharge device, a capacitor connected between the last named electrode of said gaseous discharge device and ground, said gaseous discharge device and said capacitor operating when said oscillator is out of synchronism to provide low frequency oscillations, means for coupling said low frequency oscillations to said oscillator control means to thereby vary the frequency of said oscillator when said low frequency oscillations are produced.

2. An automatic frequency control system comprising a first phase detector adapted to receive synchronizing signals, a local relatively high frequency oscillator to be synchronized with said signals, a circuit coupling said local oscillator to said first phase detector whereby a signal representative of the phase and frequency of said local oscillator will be compared by said first phase detector with the phase and frequency of said synchronizing signal, means controlling the phase and frequency of said local oscillator in response to an error voltage, a circuit connecting the output of said first phase detector to the input of said local oscillator control means, a second phase detector adapted to receive said synchronizing signals, a 90° phase shifting circuit coupling the signal representative of the phase and frequency of said local oscillator to said second phase detector, a control tube having an anode, cathode and control grid with said cathode being connected to ground, means for coupling the output of said second phase detector to the control grid of said control tube, a gaseous discharge device having one electrode connected to ground, a resistor connected between the anode of said control tube and another electrode of said gaseous discharge device, a capacitor connected between the last named electrode of said gaseous discharge device and ground, said gaseous discharge device and said capacitor operating when said local oscillator is out of synchronism to provide low frequency oscillations, means for coupling said low frequency oscillations to said local oscillator control means to thereby vary the frequency of said local oscillator when said low frequency oscillations are produced.

3. An automatic frequency control system comprising a first phase detector adapted to receive synchronizing signals, a relatively high frequency local oscillator to be synchronized with the phase and frequency of said synchronizing signals, a circuit coupling a signal representative of the phase and frequency of said local oscillator to said first phase detector, a control network and a reactance tube controlling the phase and frequency of said local oscillator in response to an error voltage from said first phase detector, the output of said first phase detector being connected to said control network so as to couple the error voltage thereto, a second phase detector adapted to receive said synchronizing signals, a 90° phase shifting circuit coupling said signal representative of the phase and frequency of said local oscillator to said second phase detector whereby said second phase detector develops a unidirectional voltage when synchronism of said local oscillator and said synchronizing signal is achieved, a control tube having an anode, a control grid and a cathode, said cathode being connected to ground, a gaseous discharge device having first and second electrodes said second electrode being connected to ground, a capacitor connected between the first electrode of said gaseous discharge device and ground, means for coupling the anode of said control tube to the first electrode of said gaseous discharge device, means for coupling the output of said second phase detector to the control grid of said control tube to cut-off said control tube when said local oscillator is out of synchronism causing said capacitor to charge until the ignition voltage of said gaseous discharge is reached at which time said capacitor discharges thereby providing a sawtooth voltage, means for applying said sawtooth voltage to said reactance tube for varying the frequency of said local oscillator when said sawtooth voltage exists.

References Cited in the file of this patent

UNITED STATES PATENTS

| | | |
|---|---|---|
| 2,287,925 | White | June 30, 1942 |
| 2,434,294 | Ginzton | Jan. 13, 1948 |
| 2,492,018 | Sunstein | Dec. 20, 1949 |
| 2,541,454 | White et al. | Feb .13, 1951 |
| 2,574,482 | Hugenholtz | Nov. 13, 1951 |
| 2,698,904 | Hugenholtz | Jan. 4, 1955 |
| 2,725,476 | Hugenholtz | Nov. 29, 1955 |
| 2,775,703 | Bourgonjon | Dec. 25, 1956 |
| 2,777,064 | Robinson | Jan. 8, 1957 |
| 2,794,910 | Arends | June 4, 1957 |